United States Patent
Derouault et al.

(10) Patent No.: US 7,353,430 B2
(45) Date of Patent: Apr. 1, 2008

(54) DEVICE FOR VALIDATING AN INTEGRATED CIRCUIT

(75) Inventors: Jacky Derouault, Caen (FR); Richard Bossuyt, Les Mesnil au Grain (FR)

(73) Assignee: NXP B.V., Eindhoven (NL)

( * ) Notice: Subject to any disclaimer, the term of this patent is extended or adjusted under 35 U.S.C. 154(b) by 441 days.

(21) Appl. No.: 10/479,028

(22) PCT Filed: May 24, 2002

(86) PCT No.: PCT/IB02/01846

§ 371 (c)(1),
(2), (4) Date: Nov. 26, 2003

(87) PCT Pub. No.: WO02/097627

PCT Pub. Date: Dec. 5, 2002

(65) Prior Publication Data

US 2004/0221206 A1 Nov. 4, 2004

(30) Foreign Application Priority Data

May 29, 2001 (FR) .................................. 01 07000

(51) Int. Cl.
*G06F 11/00* (2006.01)
(52) U.S. Cl. .................... 714/45; 714/32; 714/732; 714/735
(58) Field of Classification Search ............. 714/732, 714/45, 32, 33, 735
See application file for complete search history.

(56) References Cited

U.S. PATENT DOCUMENTS

| | | | | |
|---|---|---|---|---|
| 5,958,074 A | * | 9/1999 | Sugimoto | 714/49 |
| 6,003,142 A | * | 12/1999 | Mori | 714/30 |
| 6,173,386 B1 | * | 1/2001 | Key et al. | 712/10 |
| 6,249,893 B1 | * | 6/2001 | Rajsuman et al. | 714/741 |
| 6,253,344 B1 | * | 6/2001 | Fin et al. | 714/738 |
| 6,385,739 B1 | * | 5/2002 | Barton et al. | 714/25 |
| 2002/0026258 A1 | * | 2/2002 | Suzuki et al. | 700/112 |
| 2003/0196146 A1 | * | 10/2003 | Padwekar et al. | 714/40 |

FOREIGN PATENT DOCUMENTS

DE 199 47 603 5/2000

* cited by examiner

*Primary Examiner*—Marc Duncan
(74) *Attorney, Agent, or Firm*—Peter Zawilski

(57) ABSTRACT

A device (10) for validating a circuit (1) comprising at least one microprocessor (3) and a specialized unit (2) provided with registers includes a base (11) for receiving the circuit, a memory (4, 5) simulating an external memory with which the circuit is intended to cooperate and a computer (20) controlling the validation. The memory (4, 5) contains software for processing data received by the circuit and instructions for executing a validation sequence, making it possible to form a data flow representing a flow received by the circuit in normal operation, to compare data contained in registers of the circuit with theoretical values and to supply a signature representing a result of these comparisons.

7 Claims, 5 Drawing Sheets

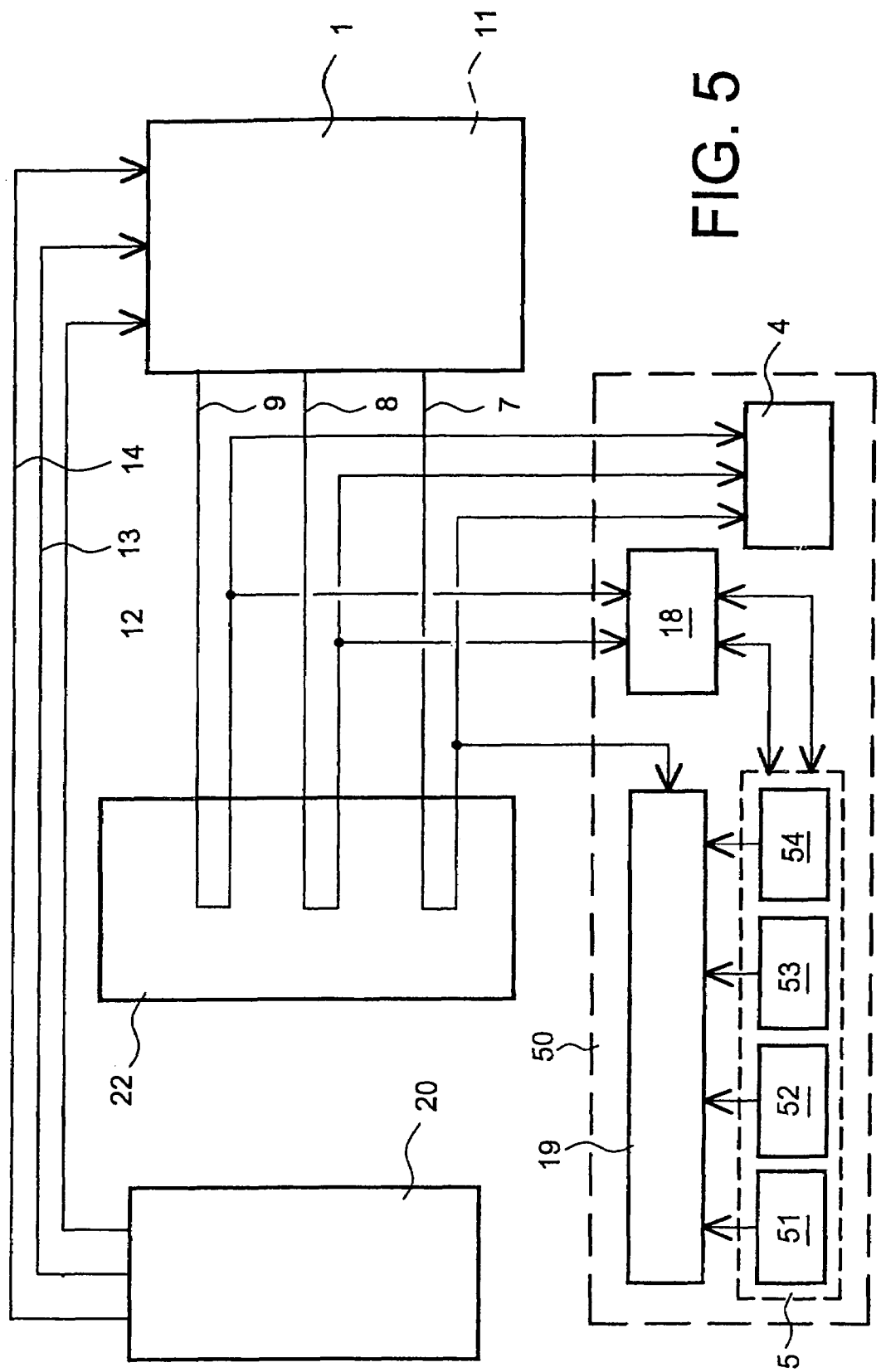

DEVICE FOR VALIDATING AN INTEGRATED CIRCUIT

FIELD OF THE INVENTION

The invention concerns the field of devices and methods intended to determine whether a circuit comprising in particular a microprocessor and possibly one or more specialized units fulfilling logical data processing functions is or is not able to function correctly. It also concerns an apparatus, for example a digital television decoder, incorporating such a circuit and an associated memory.

Patent application WO 99/48001 presents an improvement to a microprocessor validation method known as the series check technique. In a paragraph of the cited application, devoted to the description of the prior art, checking the correct functioning is carried out by means of specific software which is known as an error detection monitor, is executed by a microprocessor to be validated, and is loaded into the microprocessor to be validated in order to interface an error detection system included in an error detection computer. The error detection monitor executed by the microprocessor to be validated is software assisting the error detection system providing the access functions to the memories and registers of the microprocessor to be validated. Resources of the microprocessor to be validated are used by the error detection monitor and by the error detection computer, such as memory resources containing software and data necessary for the error detection monitor and the error detection system.

The disadvantage of such a system, indicated in the application WO 99/48001, is that it uses resources and memory within the device to be validated and that consequently the cost of using such a device is increased.

The invention relates to a device affording a fast validation of logic circuits, with a throughput of the order of several thousands of circuits per hour, making it possible to validate an entire production circuit by circuit, the probability of correct functioning in the event of positive validation being almost equal to 1.

The invention relates to a device for validating a data flow processing circuit, said circuit having inputs/outputs and including firstly at least one microprocessor intended to cooperate with a memory external to the circuit and secondly at least one specialized unit for performing a partial processing of the data, the microprocessor or the unit comprising registers ($R_i$-$R_n$), which device is characterized in that it includes a read memory containing, in addition to an operating system necessary for the functioning of the microprocessor and the specialized unit:
- a set of data suitable to supply a known data flow representing a data flow which could be received by the circuit in normal operation,
- a set of theoretical values which is to appear during processing at at least one given instant in at least one of the registers of the microprocessor or the specialized unit,
- instructions for effecting a validation, including instructions for loading the data to be processed by organizing the data in a flow and sequentially comparing values present in registers with said theoretical values, and
- instructions for supplying a signature representing results of said comparisons.

Preferably, in order to reduce the number of instructions of the data processing software devoted to the validation included in said software, a validation computer is coupled to a base intended to receive the circuit to be validated. This computer supplies the clock of the circuit to be validated, initiates and terminates a logical validation sequence, and receives, by means of the outputs of the circuit to be validated, a value representing a signature representing a result of comparisons made by the microprocessor included in the circuit to be validated.

The comparison is made between real register values of the microprocessor or the specialized unit, said values appearing at predetermined instants during the processing in one of the registers, and theoretical values stored in the read memory in order to deduce therefrom a state of functioning or non-functioning of the circuit to be validated.

Thus, in a validation device according to the invention, the circuit to be validated is provided with operating software which comprises, in addition to instructions strictly necessary for the functioning of the circuit, instructions intended to perform an autovalidation of the circuit. However, this inclusion of additional instructions comprises only instructions intended to load known data by organizing them in a known flow, comparing the content of certain registers with stored values and supplying a result of the comparisons in the form of a signature. The normal functioning of the circuit to be validated for the processing of the data is practically unchanged thereby. These additional instructions require only minimal memory space and do not interfere with the dynamic functioning of the circuit. Preferably, the data necessary for the constitution of the data flow and those necessary for the comparisons appear only in the validation device and not in the memory associated with the circuit to be validated.

The invention also concerns an apparatus, in particular a decoder, incorporating a circuit comprising at least one microprocessor and memory means associated with the circuit, the memory means containing instructions for loading, during a test phase, data representing data normally received by the apparatus in operation and for comparing data contained in the memory means with data contained in at least one register included in the circuit. According to the invention, it is the circuit which, during the validation examination successfully completed by a validation device, performs operations in accordance with its operating conditions and its connections in the apparatus in which the circuit is to be mounted.

The invention also relates to a method of validating a circuit incorporating at least one specialized unit and at least one microprocessor provided with registers, according to which method the microprocessor executes, in addition to the data processing instructions, instructions whose purpose is to provide information on the functioning of the circuit, consisting of instructions for importing data by organizing them in an incoming flow, representing a data flow which could be received by the circuit in normal operation, comparing theoretical values with actual values contained in registers of the circuit to be validated, and supplying a signature indicating results of these comparisons.

Advantageously, such a method will comprise a prior phase during which connections of the circuit to be validated are tested.

An embodiment of the invention will be now described by way of example with reference to the attached drawings to which, however, the invention is not restricted.

FIG. 5 depicts schematically the specific embodiment of the validation device depicted in FIG. 3 in a second configuration intended to test the circuit functionally.

Figure 1:
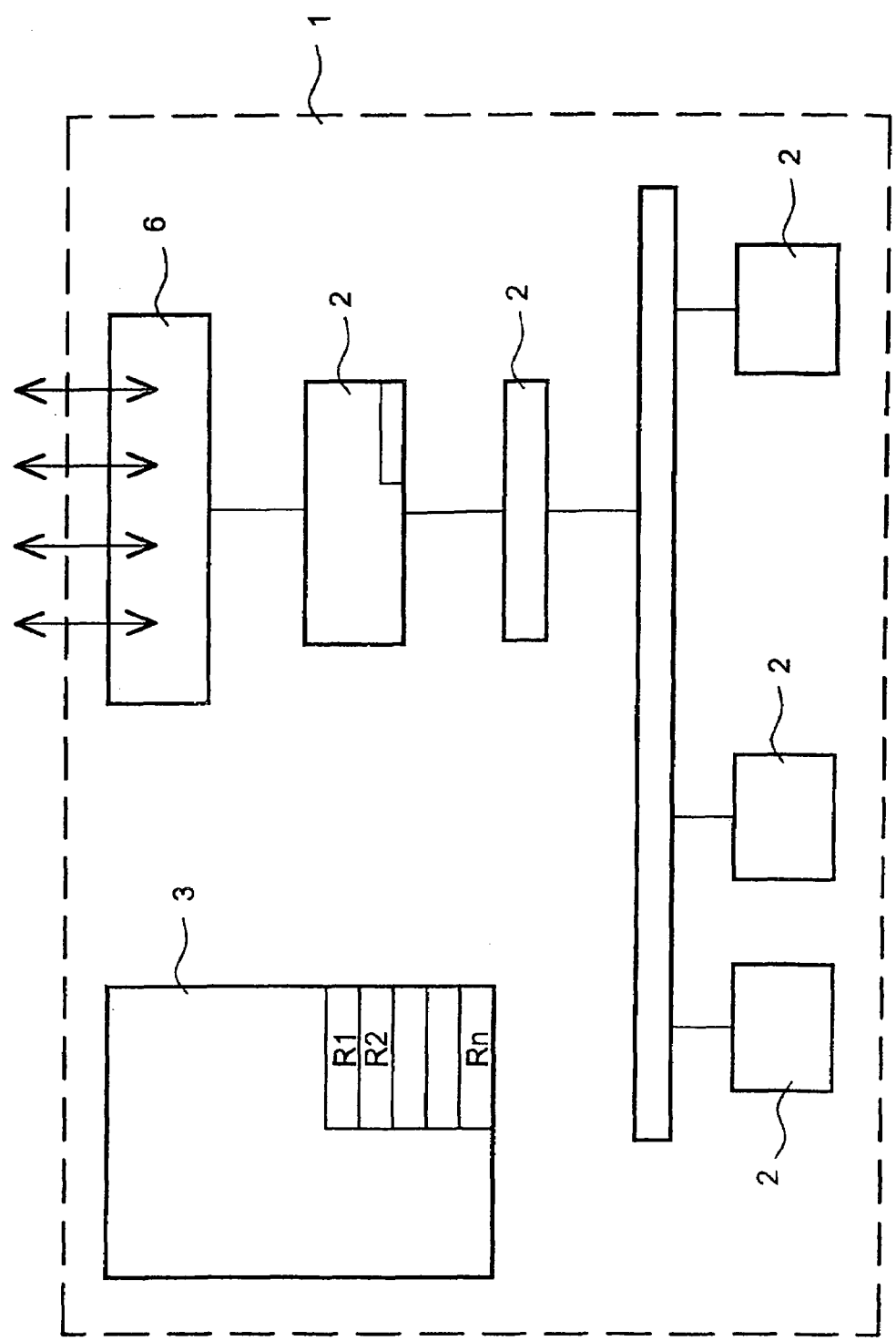
FIG. 1 depicts schematically an example of a circuit to be validated.

FIG. 1 depicts an example of a circuit 1 to be validated. The circuit 1 comprises one or more input/output interfaces 6 for communicating with memories or other circuits, and a specialized circuit tree 2 dedicated to performing functions, for example, logic functions. The circuit to be validated belongs, for example, to a digital television decoder receiving in digital form a flow of data, possibly compressed or scrambled, representing video signals, and processing these data in order to recreate a clear non-compressed video signal in which is delivered in digital or analog form. In this case, the specialized circuits 2 could be, by way of a non-limiting example, an MPEG flow processing circuit incorporating a circuit for unscrambling scrambled digital video transmissions, filters for example of sections or on headers of elementary flows packaged in elementary flow transportation packets.

The circuits 2 of the tree function under the control of a microprocessor 3 comprising registers R1, R2, R3 . . . Rn.

Figure 2:
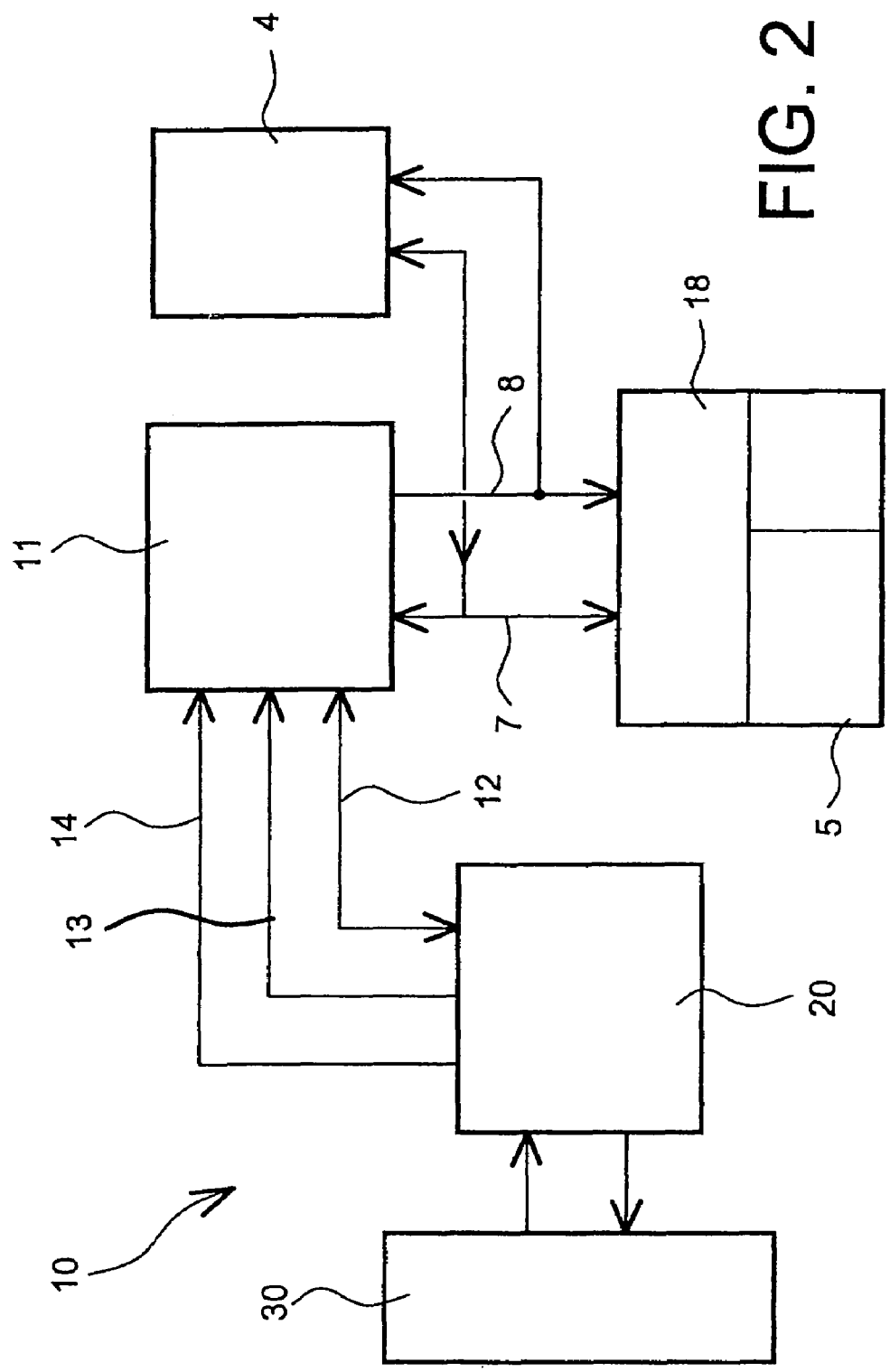
FIG. 2 depicts schematically an example of a circuit validation device according to the invention.

FIG. 2 depicts a device 10 for validating a circuit 1.

According to the invention a validation tool 10 is created, reproducing the actual operating environment of the circuit 1 to be tested. In the case envisaged here by way of example, where the circuit forms part of a decoder, it has not been necessary to reproduce for example a tuner providing the detection of the signals to be received. This part is replaced by a memory 5, for example of the ROM type, containing data representing data detected by the tuner. The quantity of data stored makes it possible to simulate a reception period and a diversity of presentations of the information detected which are sufficient for the execution of the validation. The memory contains operating software of the microprocessor 3 or of specialized circuits 2 for performing dedicated functions on the data or on data already partially processed. The memory 5 also contains values corresponding to theoretical values which must appear in registers of the microprocessor 3 or in specialized circuits 2 when the circuit 1 is operating correctly or is receiving the particular data flow coming from the memory.

A computer 20 is also added, so as to manage the validation check on the circuit 1 to be validated. This computer 20 initiates the check and ends it by giving information on the result of the validation, this result being delivered by the microprocessor 3 of the circuit 1 to be validated. The result is then used by displaying, for example on a display (not shown), a result of the check.

Figure 3:
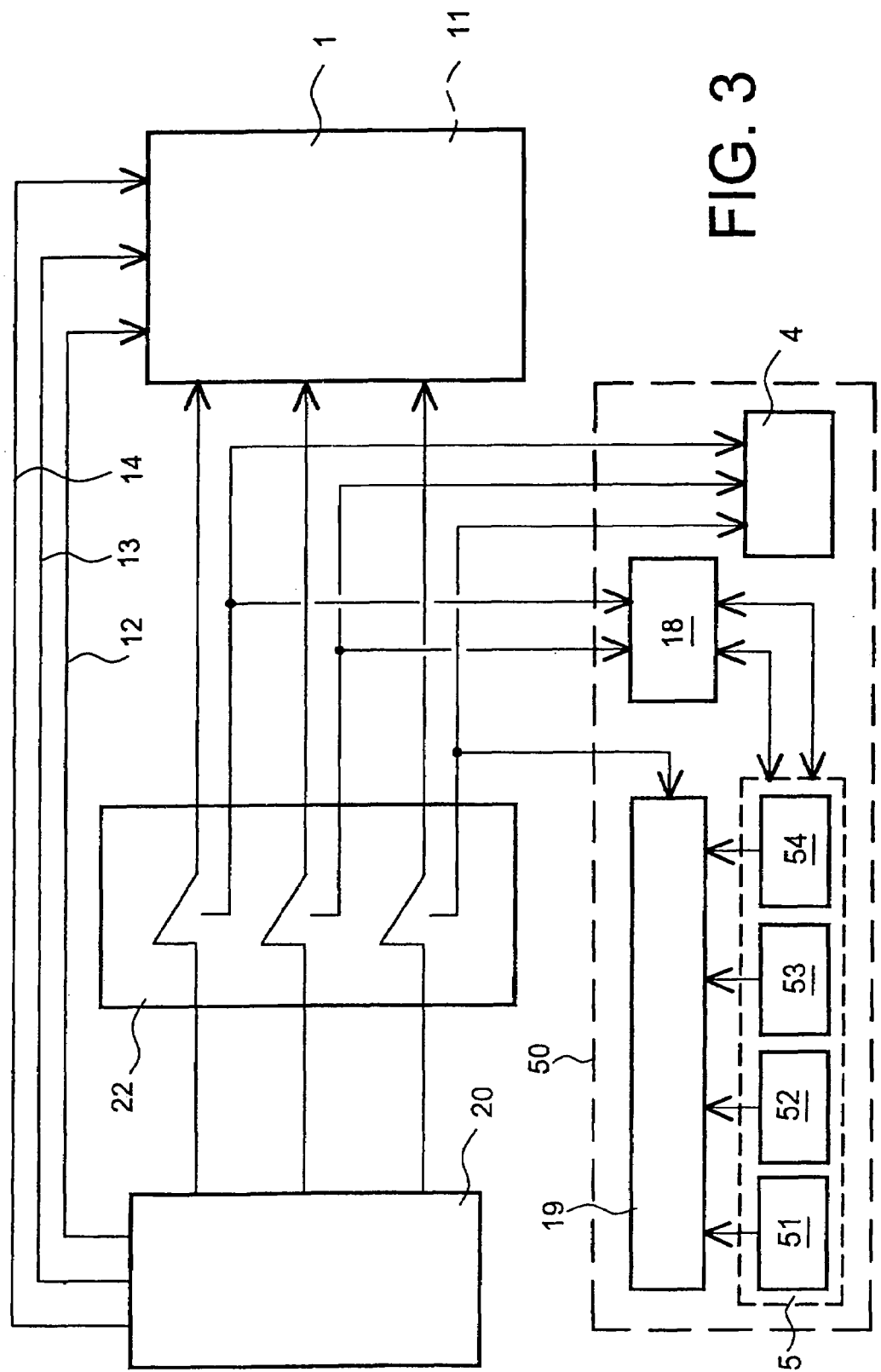
FIG. 3 depicts schematically a specific embodiment of the circuit validation device according to the invention.
Figure 4:
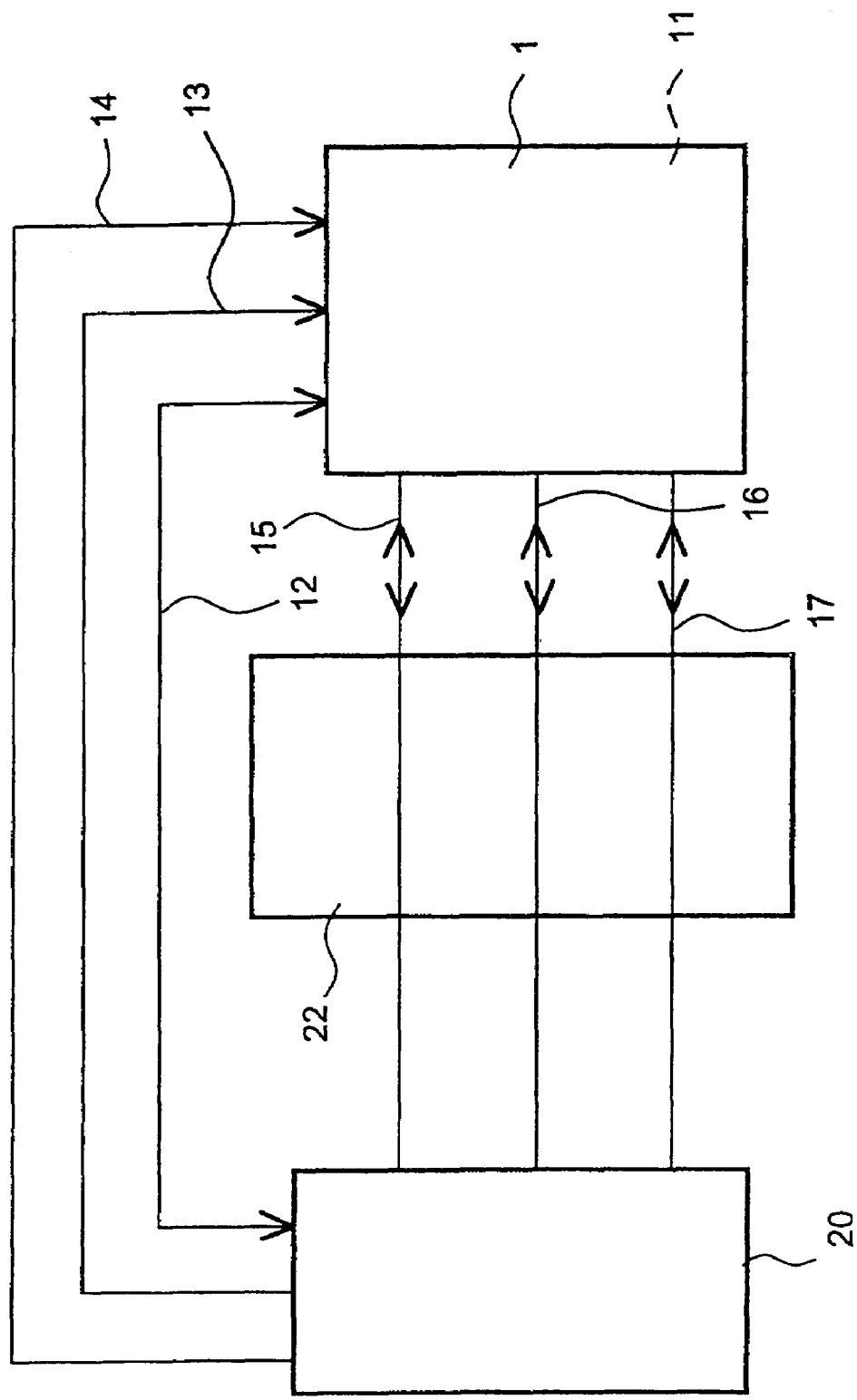
FIG. 4 depicts schematically the specific embodiment of the validation device depicted in FIG. 3 in a first configuration intended to test the circuit structurally.

The validation device 10 according to the invention comprises a base 11 for receiving a circuit 1 to be validated. The memories 4 and 5 form part of the device 10 and are connected in the same way as to the actual mounting circuit of the circuit 1 to be validated. These memories 4, 5 are connected to the circuit 1 by a data link 7 and an address link 8. The ROM memory 5, possibly in several parts 51-54 as shown in FIGS. 3-5, contains operating software of the microprocessor 3 (operating system). As indicated above it also contains values representing values which, in normal operation, could be received by the circuit 1. In the present example, concerning a digital television decoder, the data are arranged so as to be able to be put in the form of an MPEG flow. The memory 5 also contains values corresponding to theoretical values which must appear in registers of the microprocessor or specialized circuits when the circuit is functioning correctly or is receiving the particular data flow coming from the memory.

Preferably the device 10 also comprises a manipulator 30. This is a mechanical means of manipulating logic circuits 1 to be validated. The manipulator 30 grips the circuits 1, for example by means of a sucker, installs them on the base 11, grips them once again at the end of validation and places them in a path reserved for the circuits 1 which are declared in order or in a reject basket. The manipulator 30 is controlled by the validation computer 20.

In the preferred embodiment of the invention, the validation is preferably carried out in two stages. To this end, as depicted in FIG. 3, a two-position switch 22 is interposed between the validation computer 20 and the base 11.

In the two positions the links 12, 13, 14 between the computer 20 and the circuit 1, relating to functions of positioning the inputs/outputs of the circuit 1, of initialization, and of using respectively, do not pass through the switch 22.

In a first position of the switch 22 depicted in FIG. 4, the computer 20 and the circuit 1 are coupled by links 15, 16, 17 for line control, addresses and data, respectively, said links being established through the switch 22.

In a second position of the switch 22, depicted in FIG. 5, the normal functioning of the circuit 1 is monitored. A data link 7 passing through the switch 22 couples the circuit 1 to the data of the memory 5, via a converter 19 or to the memory 4. The function of the converter 19 is to adapt the logic level of the data coming from the memory 5 to a level suitable for the circuit 1. An address line 8, and a control line 9 passing through the switch 22, couple the circuit 1 to the memory 4 and via a buffer 18, to the memory 5.

The memories 51-54 together forming the memory 5, the memory 4, the buffer 18, and the converter 19 form together an embodiment of the memory means 50. Thus, the circuit 1 is coupled by means of the base 11 to the memory means 50. It should be noted that the memory means 50 are comparable to memory means working with the circuit 1 to be validated. The content of the memory means 50 is however more important in that they comprise the data for forming the flow and the register content comparison values.

In the first position, a structural validation is carried out in order to validate essentially the connections and the dynamic behavior of a few functions using one or more specialized circuits 2 of the circuit 1. The dynamic behavior of the functions is carried out using configurations coming from the validation computer 20.

In the second position the validation is carried out from data contained in the memories 4 and 5 while using the operating software of the circuit 1. In this second configuration, autoexecutable software of the microprocessor 3 of the circuit 1 connects the circuit 1 to an operating system loaded in the memory 4. After this initialization the instructions for normal data processing are executed on the data contained in the memory 5 and introduced into the circuit to be validated 1. The operating software of the circuit 1 comprises for this purpose special instructions intended for the execution of the validation. These instructions organize data contained in the memory 5 and a flow representing the MPEG flow under varied conditions, for example, and non-limiting, scrambled or in clear, static or rapidly moving images. The operating circuit of the circuit 1 also comprises instructions for making comparisons between theoretical values contained in the memory and actual values contained in designated registers.

The check on the dynamic functioning of the whole of the circuit 1 according to this second configuration of the device 10 takes place as follows:

the computer 20 managing the check initializes the circuit 1 to be validated and controls the switch 22 in order to place it in the second position.

The microprocessor 3 of the circuit to be validated starts the loading of instructions, and loads the operating software present in the ROM memory 5. The microprocessor 3 of the circuit to be validated then imports the data contained in the ROM memory by organizing them in a data flow transmitted at the normal speed at which these data travel. It has already been seen that the operating software of the microprocessor to be validated comprises, in addition to the normal instructions for processing these data, instructions for:

comparing the theoretical values stored in the ROM memory 5 with the actual values contained in the registers of the microprocessor 3 or specialized circuits 2 at predetermined processing instants, sending to the management computer 10 a signature indicating the state of the comparisons between theoretical values and actual values.

If all the actual values are equal to the theoretical values, which results in a signature having a known value of the management computer 10, then the microprocessor is declared to be in order by the inspection management computer, and if this is not the case the microprocessor is declared faulty.

The validation computer 20 pronounces the end of the validation and its result. The computer 20 then actuates the manipulator 30, which removes the circuit which has just been tested, and directs it towards the good or faulty circuits according to the result of the validation and puts in place a new circuit 1 to be validated. By way of indication the device 10 according to the invention makes it possible to validate several thousands of circuits per hour.

The invention claimed is:

1. A device for validating a data flow processing circuit, said circuit having inputs/outputs and including firstly at least one microprocessor intended to cooperate with a memory external to the circuit and secondly at least one specialized unit for performing a partial processing of the data, the microprocessor or the unit comprising registers, which device includes a read memory containing, in addition to an operating system necessary for the functioning of the microprocessor and the specialized unit: a set of data suitable to supply a known real-time data flow representing a real-time data flow which could be received by the circuit in normal operation, a set of theoretical values which is to appear during processing at least one given instant in at least one of the registers of the microprocessor or the specialized unit, instructions for effecting a validation, including instructions for loading the data to be processed by organizing the data in a flow and sequentially comparing values present in registers with said theoretical values, and instructions for supplying a signature representing results of said comparisons, and which device further includes a validation computer that controls selection between a first configuration in which the circuit to be validated has inputs/outputs connected to the validation computer, and a second configuration in which the same inputs/outputs are connected to the external memory.

2. A validation device as claimed in claim 1, wherein the validation computer is coupled to a base intended to receive the circuit to be validated.

3. A validation device as claimed in claim 1, further comprising a switch controlled by the validation computer controls to allow selection between the first and second configurations.

4. A validation device as claimed in claim 1, also including a manipulator for placing and removing circuits to be validated, said manipulator being controlled by the validation computer.

5. A method of validating a circuit incorporating at least one specialized unit and at least one microprocessor provided with registers, the microprocessor intended to cooperate with an external memory, according to which method the microprocessor executes, in addition to the data processing instructions, instructions whose purpose is to provide information on the functioning of the circuit, consisting of instructions for importing data by organizing them in an incoming real-time data flow, representing a real-time data flow which could be received by the circuit in normal operation, comparing theoretical values with actual values contained in registers of the circuit to be validated, and supplying a signature indicating results of these comparisons, and further comprising switching between a first configuration in which the circuit is connected to supply the signature, and a second configuration in which the circuit is connected to the external memory to receive and execute the instructions.

6. A method as claimed in claim 5, wherein it comprises a prior phase during which connections of the circuit to be validated are tested.

7. For use with a device for validating a digital television decoder, the validating device including a validation computer and an external memory, and the decoder including input/output interfaces and circuitry for receiving and processing data representing video signals, a method comprising:

switching between a first configuration in which the input/output interfaces of the decoder are connected to the validation computer and a second configuration in which the input/output interfaces of the decoder are connected to the external memory;

initializing communications links between the validating device and the decoder in the first configuration;

in the second configuration, providing from the external memory to the decoder:

a known real-time data flow representing a real-time data flow that could be received by the decoder during normal operation, a set of theoretical values, instructions for performing a validation, including instructions for organizing and processing the known real-time data flow and for sequentially comparing resulting values with the set of theoretical values, and instructions for supplying back to the validating device a signature representing results of the comparing;

receiving the signature at the validation computer in the first configuration, the validation computer processing the signature to produce a validation result; and declaring the decoder functional or faulty based on the validation result.

* * * * *